United States Patent [19]

Forberg et al.

[11] 4,420,200
[45] Dec. 13, 1983

[54] SURGE-PROTECTED CABLE JOINT

[75] Inventors: Horst Forberg; Wolfgang Radelow; Klaus-Peter Achtnig; Manfred Müller, all of Berlin, Fed. Rep. of Germany

[73] Assignee: Krone GmbH, Berlin, Fed. Rep. of Germany

[21] Appl. No.: 253,725

[22] Filed: Apr. 13, 1981

[30] Foreign Application Priority Data

Aug. 16, 1980 [DE] Fed. Rep. of Germany ... 8021913[U]

[51] Int. Cl.³ .......................................... H01R 13/648
[52] U.S. Cl. .................................... 339/13; 339/14 L; 339/147 R
[58] Field of Search ............... 179/1 PC, 98; 361/119; 339/13, 14 L, 18 R, 18 C, 18 P, 136 R, 147 R, 147 C, 147 P, 151 C, 151 M, 198 R

[56] References Cited

U.S. PATENT DOCUMENTS

| | | | |
|---|---|---|---|
| 3,820,056 | 6/1974 | Ayer | 339/198 R |
| 3,915,540 | 10/1975 | Thompson et al. | 339/14 L |
| 4,053,719 | 10/1977 | Debortoli et al. | 339/18 R |
| 4,272,147 | 6/1981 | Berglund et al. | 339/147 R |
| 4,326,107 | 4/1982 | Perna | 179/1 PC |
| 4,345,294 | 8/1982 | Forberg et al. | 361/119 |

FOREIGN PATENT DOCUMENTS 1303654 1/1973 United Kingdom .
1316483 5/1973 United Kingdom .

Primary Examiner—John McQuade
Attorney, Agent, or Firm—Brown & Martin

[57] ABSTRACT

The invention relates to a surge-protected cable joint for telecommunication networks, comprising a joint casing closed at either end and having axial cable inlets, and terminal strips for the cable wires secured in the casing interior. In order to permit connection of an increased number of cable wires without increasing the external dimensions while at the same time obtaining a higher resistance to surge currents, the individual terminal strips are disposed within the joint interior in a plurality of double rows arranged in series and each row is fixedly mounted within a trough, thus resulting in a wiring free from crossover points and in an increased number of connections. The receiving troughs (2, 2a) are bolted together in pairs with their bottoms adjacent each other, and are secured to lateral connecting rails (4). These connecting rails (4) in turn are mechanically and electrically coupled via support rails (6) to one of the end walls of the joint casing (1) and via an earth cable to a connecting bolt (5). Furthermore, surge arrester magazines (8) are detachably secured, e.g. by clamping, on the individual terminal strips.

2 Claims, 3 Drawing Figures

SURGE-PROTECTED CABLE JOINT

The present invention relates to a surge-protected cable joint for telecommunication networks, comprising a joint casing closed at either end and having axial cable inlets, and terminal strips secured in the joint interior for the cable wires.

Various designs of surge-protected cable joints have already been known, in which the cables are already connected at the place of manufacture and the surge arresters are seated on printed boards inserted into multipoint connectors. However, due to the relatively small conductor diameter these known cable joints have a rather low resistance to surge currents.

Also, upon installation of such a surge-protected cable joint in a buried cable it is necessary to use two additional joints for connecting the two ends of the buried cable with the cable ends extending from the joint, whereby the costs are considerably increased.

Finally, the number of cable cores or wires which can be connected with these known joints is insufficient.

It is an object of the present invention to provide a surge-protected cable joint, in which the two ends of the buried cable may directly be connected to the terminal strips, and which while being of usual size permits connection of an increased number of twin-wires.

In accordance with the present invention this object is solved in that within the joint interior a plurality of rows of terminal strips is provided on either side of a central longitudinal plane so as to extend longitudinally in series, and in that each row of terminal strips is secured within a receiving trough, and in that pairs of the receiving troughs are secured with their bottoms facing one another and to lateral connecting rails, said connecting rails being mechanically and electrically coupled by means of support rails to the two sealing end plates of the joint casing.

Due to the structure of the unit received within the joint casing, and particularly in view of the longitudinal arrangement of the terminal strips in a plurality of rows provided in series within the joint casing, it is possible to make the wiring without any crossover points. Moreover, the capacity, i.e., the number of twin-wires to be connected, of the surge-protected cable joint according to the present invention may be increased by about 50% with respect to known cable joints.

In accordance with an advantageous further development of the invention the surge arresters are provided in the form of magazines and may be detachably secured to the terminal strips, e.g. by means of multipoint connectors.

With the terminal strips employed, the resistance to surge currents can be increased from 4 kA to 10 kA with a waveform of 8/20.

An embodiment of the invention will be described in detail below with reference to the accompanying drawing, in which.

Figure 2:
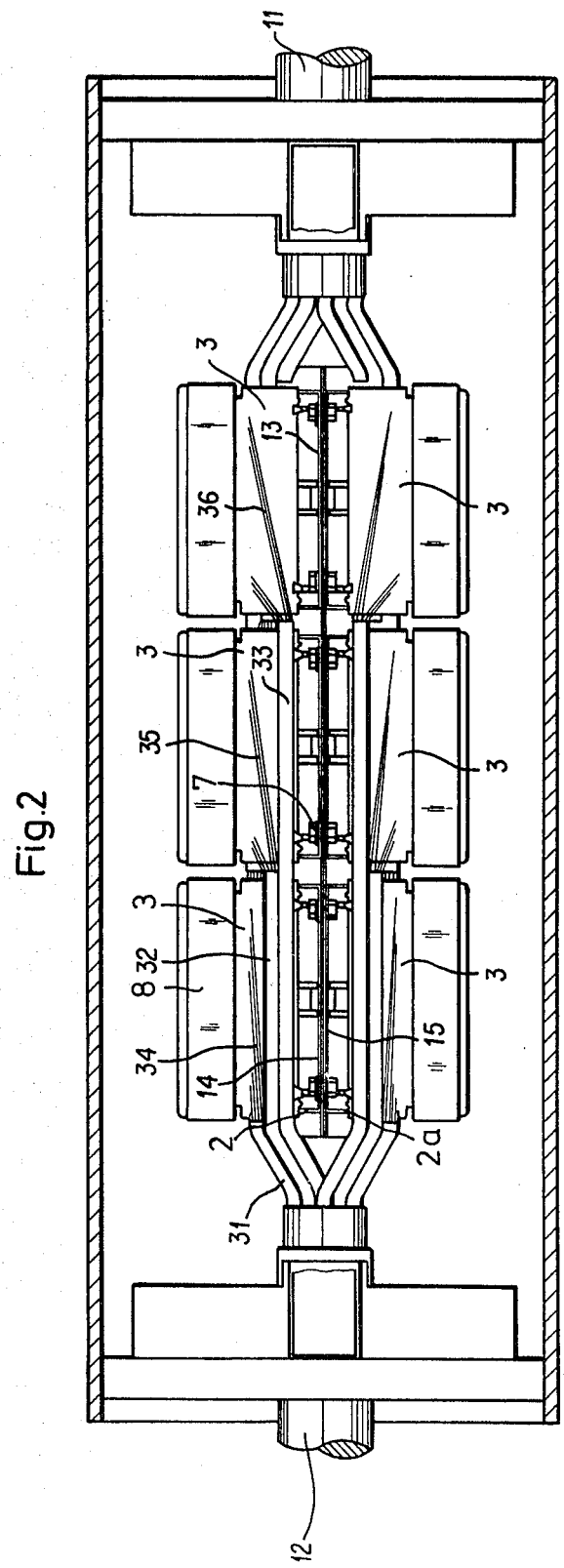
FIG. 2 is a plan view of the unit including the cable joint as shown in FIG. 1.
Figure 3:
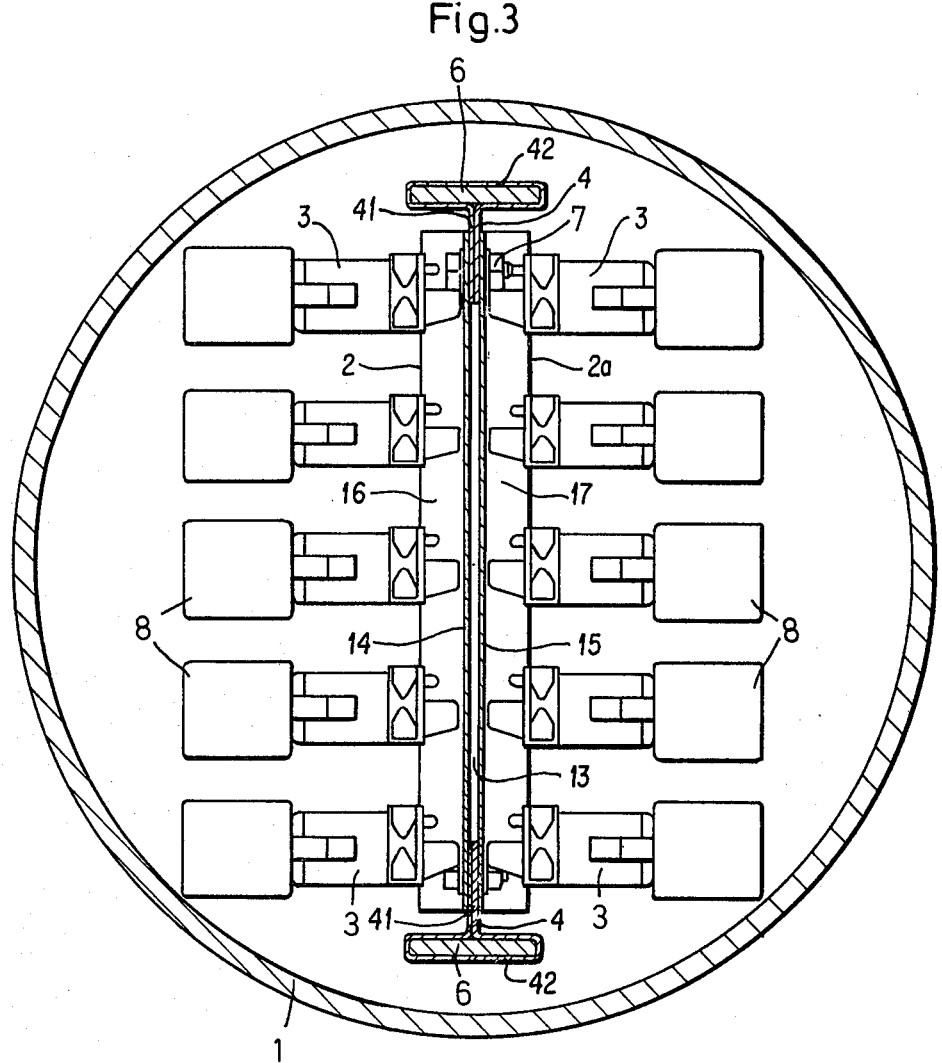
FIG. 3 is a front view of the cable joint and the unit as shown in FIG. 1 and FIG. 2, respectively.

The cable joint shown in the drawing comprises a tubular joint casing 1 having electrically insulative end plates 1a, 1b and cable inlets 1c, 1d for main cables 11 and 12. A preassembled unit is mounted within the joint casing and comprises three twin rows of terminal strips 3 disposed symmetrically relative to a central longitudinal plane, the terminal strips 3 of each row being mounted each within a trough 2, 2a. The bottoms 14, 15 of the troughs 2, 2a of each row are secured to one another by means of screw connections 7 (FIGS. 2, 3).

Troughs 2, 2a are metal frames having flat bottoms (14, 15) and spaced parallel sides 16, 17 extending upwardly from the bottoms.

Each contact is adapted to receive and make electrical connection with a conductive wire of a sub-cable from the main cable 11, 12.

Figure 1:
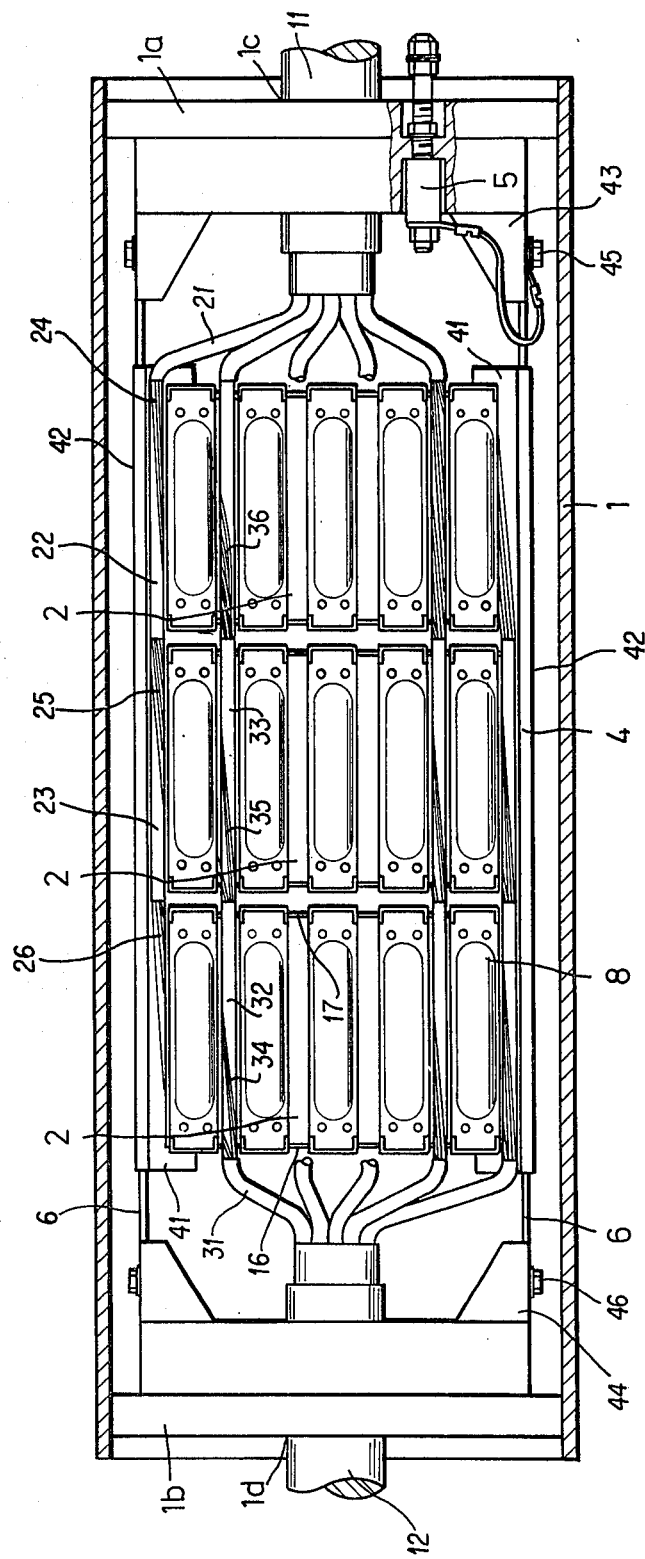
FIG. 1 is a side view of a unit mounted within a cable joint shown in longitudinal sectional view.

Cable 11 has sub-cables 21, 22, 23, each of which includes a multiplicity of conductive wires 24, 25, 26. These wires are connected to individual contacts on one side of strips 3 (FIG. 1). Cable 12 has sub-cables 31, 32, 33, which include a respective multiplicity of conductive wires 34, 35, 36. These wires are connected to the contacts on the other side of the same terminal strips.

A surge arrester magazine 8 each is detachably plugged onto the individual terminal strips 3 and is in electrical contact with one of the troughs 2, 2a. The surge arrestor functions in a normal manner to protect the electrical circuitry.

The preassembled unit is fixed in the interior of the joint casing 1 by means of longitudinally extending support rails 6, which are mechanically and electrically coupled to lateral connecting rails 4, wherein an earth connection is made through an earth cable provided between one end of the support rail and a connecting bolt 5 fixedly mounted in the end wall 1a. Connecting rails 4 are partially hollow, elongated elements having a T-shape cross section (FIG. 3). Stem 41 is comprised of facing confronting flat strips and these are clamped between troughs 2, 2a. The cap 42 of rail 4 is hollow and support rail 6 extends the length thereof, projecting outwardly from either end and attached to the end plates by means of brackets 43, 44 and bolts 45, 46 (FIG. 1). Thus it may be seen how the surge arrestors 8 are mounted to the terminal strips 3 but make electrical ground contact with troughs 2, 2a, rails 4 and 6 and out through grounding bolt 5.

A significant advantage of the surge-protected cable joint described above resides in that it is possible to use a great number of commerically available component parts such as joint casings, terminal strips, and troughs, so that the additional structural expenditure required to achieve surge protection will be relatively limited.

What we claim is:

1. A surge-protected cable joint for telecommunication networks, comprising a joint casing closed at either end and having axial cable inlets, and terminal strips secured in the joint interior for the cable wires, characterized in that within the joint interior a plurality of rows of terminal strips (3) is provided on both sides of a central longitudinal plane so as to extend longitudinally in series, that each row of terminal strips (3) is secured within a receiving trough (2, 2a), and that pairs of the receiving troughs (2, 2a) are secured with their bottoms facing each other and to lateral connecting rails (4), said connecting rails (4) being mechanically and electrically coupled by means of support rails (6) to the two sealing end plates of the joint casing.

2. A cable joint as claimed in claim 1, characterized in that surge arrester magazines (8) are detachably secured to the terminal strips (3).

* * * * *